United States Patent [19]

Braun

[11] Patent Number: 4,846,891
[45] Date of Patent: Jul. 11, 1989

[54] TITANIUM DIOXIDE PIGMENT, ELECTROPHORETIC COATING COMPOSITIONS INCLUDING SUCH PIGMENT, AND METHOD FOR TREATING TITANIUM DIOXIDE PIGMENT

[75] Inventor: Juergen H. Braun, Hockessin, Del.

[73] Assignee: E. I. Du Pont of Nemours and Company, Wilmington, Del.

[21] Appl. No.: 76,521

[22] Filed: Jul. 22, 1987

[51] Int. Cl.$^4$ ................................................ C09C 1/36
[52] U.S. Cl. ..................................... 106/436; 106/401; 423/610
[58] Field of Search ............... 204/181.4, 181.7, 181.5, 204/299 EL, 300 EL; 423/610, 614; 106/400, 401, 403, 436, 437, 449, 461, 479

[56] References Cited

U.S. PATENT DOCUMENTS

| | | | |
|---|---|---|---|
| 2,305,368 | 12/1942 | Whitten | 423/610 |
| 3,362,899 | 1/1968 | Gilchrist | 204/181 |
| 3,575,909 | 4/1971 | Gilchrist | 260/29.2 |
| 3,591,478 | 7/1971 | Crickison | 204/181 |
| 3,635,819 | 1/1972 | Schurr et al. | 204/181 |
| 4,456,514 | 6/1984 | Misawa et al. | 204/180.8 |

OTHER PUBLICATIONS

Kirk-Othmer Encyclopedia, vol. 23 pp. 139-145, 149, 159-163, 1983.

*Primary Examiner*—John F. Niebling
*Assistant Examiner*—Kathryn Gorgos

[57] ABSTRACT

A process is disclosed for producing TiO$_2$ pigment which is substantially improved for use in electrophoretic coating compositions. The process comprises adjusting an aqueous slurry of the pigment to a pH of about 6.5-7.5, maintaining such pH at a temperature and for a time which is sufficient to maintain substantial equilibrium, and washing the pigment. There also is disclosed TiO$_2$ pigment which is produced by the foregoing process.

14 Claims, No Drawings

TITANIUM DIOXIDE PIGMENT, ELECTROPHORETIC COATING COMPOSITIONS INCLUDING SUCH PIGMENT, AND METHOD FOR TREATING TITANIUM DIOXIDE PIGMENT

BACKGROUND OF THE INVENTION

This invention relates to a method for treating titanium dioxide pigment, a titanium dioxide pigment resulting therefrom, and electrophoretic coating compositions which incorporate such pigment.

Electrophoretic deposition of coating compositions is well known and is especially useful for applying a primecoat to automobile bodies or other metal fabrications. In such a process, the item to be coated is immersed in the electrophoretic coating composition, and the coating is deposited onto the desired item by the application of electric current.

Titanium dioxide pigment is often used in electrophoretic coating compositions. However, commercially available grades of such pigment often can cause instability of such compositions and defects in the cured paint film. Accordingly, the need exists for a titanium dioxide pigment which does not have the foregoing undesirable properties.

The following references are disclosed as being of interest to the subject matter of this invention:

U.S. Pat. No. 3,635,810 is directed to electrocoating with desulfated pigments. This patent discloses that impurities which detrimentally affect the electrocoatability of the pigment composition are removed by treating the pigment composition with a water-soluble barium (cationic) compound. The specific impurity which is removed is a sulfate (an anion).

U.S. Pat. No. 3,591,478 is directed to an electrocoating process. The quality of electrocoated film is affected by the level of anionic contaminants in the coating bath.

U.S. Pat. Nos. 3,362,899 and 3,575,909 (related patents) disclose that it is advantageous that water-soluble salts in the pigment, such as sodium or potassium salts, be absent from the bath or present in very low amounts. Neither patent discloses how the water-soluble salts are removed nor do they suggest any acceptable levels.

SUMMARY OF THE INVENTION

The present invention relates to titanium dioxide pigment having:
 (a) less than about 13 microequivalents of extractable univalent cation per gram of titanium dioxide,
 (b) less than about 15 microequivalents of extractable divalent cation per gram of titanium dioxide,
 (c) less than about 11 microequivalents of extractable univalent anion per gram of titanium dioxide,
 (d) less than about 8 microequivalents of extractable divalent anion per gram of titanium dioxide,
 (e) less than about 6 microequivalents of extractable trivalent anion per gram of titanium dioxide, and
 (f) less than a combined total of about 40 microequivalents of extractable anions and cations per gram of titanium dioxide.

The present invention also relates to an electrophoretic coating composition containing the foregoing pigment.

In addition, the present invention relates to a process for treating titanium dioxide pigment, which comprises:

(a) subjecting titanium dioxide pigment to a wet treatment which includes immersion in an aqueous medium;
 (b) adjusting the pH of the product of step (a) to about 6.5 to 7.5;
 (c) maintaining the pH of the product of step (b) at about 6.5 to 7.5 at a temperature and for a time which is sufficient to attain substantial equilibrium of the pH of the aqueous medium with the titanium dioxide pigment; and
 (d) removing the aqueous medium from the product of step (c) and washing the remaining titanium dioxide pigment until it has the properties specified in claim 1.

It has been found that the process of this invention produces titanium dioxide pigment which is substantially improved for use in electrophoretic coating compositions. Specifically, compared to known commercial titanium dioxide pigment, the pigment of this invention produces (a) electrophoretic coating compositions which are more stable (e.g. less gelling, settling, coagulation and/or formation of lumps), and (b) cured electrophoretic paint films which have fewer defects (e.g. fewer holes and/or craters).

DESCRIPTION OF THE INVENTION

While not wanting to be bound to any particular theory, it is believed that the detrimental properties of titanium dioxide pigment in electrocoating compositions are due to the presence of anions, cations, or their precursors in, bound to, absorbed, chemisorbed, or associated with the titanium dioxide pigment. (Such anions, cations, and their precursors will hereinafter be referred to as anions or cations, as the case may be.) The anions and cations are believed to be present due to their introduction in the titanium dioxide manufacturing and/or wet treatment process or due to their existence in the titanium-containing ores used to produce the titanium dioxide pigment.

Examples of cations include those of the alkali metals (i.e., lithium, sodium, potassium, rubidium, and cesium) and those of the alkaline earth metals (i.e., magnesium, calcium, strontium, and barium). Examples of anions include chloride, sulfate, phosphate, vandate, and molybdate. Other anions and cations can be present due to variances in ores, manufacturing, and wet treatment processes for producing the titanium dioxide pigment.

Preferably, the extractable univalent cation is selected from the group consisting essentially of lithium, sodium, potassium, rubidium, cesium, and mixtures thereof; the extractable divalent cation is selected from the group consisting essentially of magnesium, calcium, strontium, barium, and mixture thereof; the extractable univalent anion is selected from the group consisting essentially of chloride, nitrate, and mixtures thereof; the extractable divalent anion is selected from the group consisting essentially of sulfate, molybdate, and mixtures thereof; and the extractable trivalent anion is selected from the groups consisting essentially of phosphate, vanadate, and mixtures thereof.

By the term "extractable" anion or cation, as used herein, is meant that the anions and/or cations in, bound to, absorbed, chemisorbed, or associated with the titanium dioxide pigment can be removed and the amount thereof analyzed by conventional analytic techniques which do not substantially destroy the titanium dioxide pigment particles. Techniques for removal include treating the pigment with an aqueous solution of acid or base. Techniques for analyses include ion chromatography, flame spectroscopy, and titration. Such techniques are known and are described, for example, in A. Vogel, *Textbook of Quantitative Inorganic Analysis*, 4th Edition, Longman Group Limited, New York, 1978, and H. H. Willard, L. L. Merritt, Jr., J. A. Dean, and F. A. Settle, Jr. *"Instrumental Methods of Analysis"*, 6th Edition, D. Van Norstrand Company, New York, 1981, the disclosures of which are hereby incorporated by reference.

The amount of anions and/or cations which are extractable is important because when the $TiO_2$ pigment is immersed in the electrophoretic coating composition, acidic or basic conditions, and possibly elevated temperatures, are believed to extract ions from the $TiO_2$ pigment and dissolve them in the composition and cause detrimental results.

Titanium dioxide pigment, which is treated in accordance with the process of this invention, can be made by either the chloride or sulfate process. Suitable methods for making titanium dioxide pigments by the chloride process are disclosed in U.S. Pat. Nos. 2,701,179, 2,788,439, 3,208,866, and 3,505,091, the disclosures of which are hereby incorporated by reference.

In step (a) of the process of this invention, titanium dioxide pigment is subjected to a wet treatment which includes immersion in aqueous medium. The term "wet treatment", as used herein, means immersion of pigment in aqueous medium and, if desired, processing to coat the pigment with at least one desired surface treatment agent. The immersion in water will help to remove HCl and chlorine from the pigment. Wet treatment processes which include coating the titanium dioxide pigment with surface treatment agents are known and are disclosed, for example, in U.S. Pat. Nos. 3,383,231, 3,522,078, and 3,876,422, which are hereby incorporated by reference. Often the surface treatment agents are dissolved or dispersed in the aqueous medium, and the conditions are adjusted to cause the agents to coat the pigment. Common surface treatment agents include hydrous metal oxides such as titania, alumina, or silica, or combinations thereof.

In step (b) of the process of this invention, the product of step (a) is adjusted to about 6.5 to 7.5, preferably about 6.8 to 7.2 and most preferably about 7. The pH can be adjusted by any suitable acid or base such as hydrochloric acid, sulfuric acid, sodium hydroxide, potassium hydroxide or ammonium hydroxide. Preferred are sodium hydroxide and hydrochloric acid.

In step (c) of the process of this invention, the product of step (b) is maintained at a pH of about 6.5 to 7.5 preferably about 6.8 to 7.2, and most preferably about 7, at a temperature and for a time which is sufficient to attain substantial equilibrium of the pH of the medium with the titanium dioxide. Whether or not the medium has obtained equilibrium with the titanium dioxide can be determined by periodically measuring the pH of the medium. If the pH changes, then equilibrium has not been obtained. Also, if the pH changes to be outside of the desired range, then additional acid or base, whichever is needed, should be added to maintain the required pH. The temperature required for this step of the process typically is about 20°–95° C., preferably about 50°–80° C. and most preferably about 50°–70° C. Of course, the higher the temperature, the less time that will be required for this step. The time required for this step will be at least about 5 minutes. Usually, the time required will be about 5 minutes to 24 hours, preferably about 10 minutes to 8 hours and most preferably about 30 minutes to 3 hours.

Step (d) of the process of this invention comprises removing the aqueous medium from the product of step (c) and washing the remaining titanium dioxide pigment until it has:

(a) less than about 13, preferably less than about 7, and most preferably less than about 4 microequivalents of extractable univalent cation per gram of titanium dioxide, (b) less than about 15, preferably less than about 8, and most preferably less than about 4 microequivalents of extractable divalent cation per gram of titanium dioxide, (c) less than about 11, preferably less than about 6, and most preferably less than about 3 microequivalents of extractable univalent anion per gram of titanium dioxide, (d) less than about 8, preferably less than about 5, and most preferably less than about 3 microequivalents of extractable divalent anion per gram of titanium dioxide, (e) less than about 6, preferably less than about 4, and most preferably less than about 2 microequivalents of extractable trivalent anion per gram of titanium dioxide, and (f) less than a combined total of about 40, preferably less than a combined total of about 27, and microequivalents of extractable anions and cations per gram of titanium dioxide.

The aqueous medium can be removed by any suitable means such as filtering, decanting, settling, drying, evaporation, washing, etc. Filtering is preferred. The washing is carried out preferably with water. The removal of the aqueous medium and the washing can be carried out separately or concurrently.

Afterwards, the pigment preferably is dried and ground by suitable means to break up agglomerates of pigment particles. Suitable grinding means include fluid energy mills such as steam micronizers.

The resulting titanium dioxide pigment can be used in electrophoretic coating compositions. Suitable electrophoretic coating compositions are disclosed in U.S Pat. Nos. 3,591,478, 3,575,909, and 3,362,899, the disclosures of which are hereby incorporated by reference.

EXAMPLE 1

Untreated titanium dioxide pigment produced by the chloride process was dispersed in water to produce a slurry and subjected to a wet treatment which deposited a coating of hydrous alumina on the pigment. The hydrous alumina represented about three percent of the pigment weight and was deposited by dissolving sodium aluminate in aqueous medium, adding the solution to the titanium dioxide slurry, and precipitating the hydrous alumina by adding hydrochloric acid. The technique of application of the alumina and the ratios of the reactants used were similar to those used in Example 2.

The resulting wet treatment pigment slurry was pH adjusted with hydrochloric acid from pH 8.5 to about 70° C. The pH adjusted slurry was then cured at about 70.C for two hours while maintaining the pH at about 7.0 by the addition of small quantities of hydrochloric acid and/or sodium hydroxide. The slurry was then filtered, washed, dried, and steam micronized. The resulting pigment had 4.0 microequivalents of extractable sodium per gram of $TiO_2$, 5.9 microequivalents of extractable calcium per gram of $TiO_2$, 4.0 microequivalents of extractable chloride per gram of $TiO_2$, and 3.8 microequivalents of extractable sulphate per gram of $TiO_2$.

EXAMPLE 2

In a stirred vessel, 6200 grams of rutile titanium dioxide pigment made by the chloride process can be mixed with 15.5 liters of water. The mixture can be heated to approximately 60° C. to a resulting pH of about 3.4. Concentrated sulphuric acid in the amount of 28 milliliters can be added to lower the pH to 1.5. During a thirty minute period, 517 milliliters of sodium aluminate solution (360 grams $Al_2O_3$ per liter) can be added at a pH of 8.5. The pH can be maintained by adding 103 milliliters of concentrated sulphuric acid. The alumina-coated pigment slurry can then be cured for approximately thirty minutes at a pH of 8.5 and at a temperature of 60° C.

The foregoing alumina-coated titanium dioxide pigment slurry can be pH adjusted from 8.5 to approximately 7.0 and cured for about 2 hours at 60° C. Next, slurry can be filtered and washed to make a $TiO_2$ pigment having the properties of less than about 13 microequivalents of extractable univalent cation per gram of titanium dioxide, less than about 15 microequivalents of extractable divalent cation per gram of titanium dioxide, less than about 11 microequivalents of extractable univalent anion per gram of titanium dioxide, less than about 8 microequivalents of extractable divalent anion per gram of titanium dioxide, less than about 6 microequivalents of extractable trivalent anion per gram of titanium dioxide and less than a combined total of about 40 microequivalents of extractable anions and cations per gram of titanium dioxide.

The pigment can then be dried at 120° C. The dried pigment can be steam micronized and incorporated in electrophoretic coating compositions by known techniques.

The present invention may be embodied in other specific forms without departing from the spirit or essential attributes thereof and, accordingly, reference should be made to the appended claims, rather than to the foregoing specification, as indicating the scope of the invention.

The Invention claimed is:

1. A titanium dioxide pigment having:
(a) less than about 13 microequivalents of extractable univalent cation per gram of titanium dioxide,
(b) less than about 15 microequivalents of extractable divalent cation per gram of titanium dioxide,
(c) less than about 11 microequivalents of extractable univalent anion per gram of titanium dioxide,
(d) less than about 8 microequivalents of extractable divalent anion per gram of titanium dioxide,
(e) less than about 6 microequivalents of extractable trivalent anion per gram of titanium dioxide, and
(f) less than a combined total of about 40 microequivalents of extractable anions and cations per gram of titanium dioxide.

2. The pigment of claim 1 wherein:
(a) the extractable univalent cation is present in an amount of less than about 7 microequivalents per gram of titanium dioxide,
(b) the extractable divalent cation is present in an amount of less than about 8 microequivalents per gram of titanium dioxide,
(c) the extractable univalent anion is present in an amount of less than about 6 microequivalents per gram of titanium dioxide,
(d) the extractable divalent anion is present in an amount of less than about 5 microequivalents per gram of titanium dioxide,
(e) the extractable trivalent anion is present in an amount of less than about 4 microequivalents per gram of titanium dioxide, and
(f) the combined total of the extractable cations and anions is less than about 27 microequivalents per gram of titanium dioxide.

3. The pigment of claim 1 wherein:
(a) The extractable univalent cation is present in an amount of less than about 4 microequivalents per gram of titanium dioxide,
(b) the extractable divalent cation is present in an amount of less than about 4 microequivalents per gram of titanium dioxide,
(c) the extractable univalent anion is present in an amount of less than about 3 microequivalents per gram of titanium dioxide,
(d) the extractable divalent anion is present in an amount of less than about 3 microequivalents per gram of titanium dioxide,
(e) the extractable trivalent anion is present in an amount of less than about 2 microequivalents per gram of titanium dioxide, and
(f) the combined total of the extractable cations and anions is less than about 14 microequivalents per gram of titanium dioxide.

4. The titanium dioxide pigment of claim 1 wherein:
(a) the extractable univalent cation is selected from the group consisting essentially of lithium, sodium, potassium, rubidium, cesium, and mixtures thereof,
(b) the extractable divalent cation is selected from the group consisting essentially of magnesium, calcium, strontium, barium, and mixtures thereof,
(c) the extractable univalent anion is selected from the group consisting essentially of chloride, nitrate, and mixtures thereof,
(d) the extractable divalent anion is selected from the group consisting essentially of sulfate, molybdate, and mixtures thereof,
(e) the extractable trivalent anion is selected from the groups consisting essentially of phosphate, vanadate, and mixtures thereof.

5. The titanium dioxide pigment of claim 2 wherein:
(a) the extractable univalent cation is selected from the group consisting essentially of lithium, sodium, potassium, rubidium, cesium, and mixtures thereof,
(b) the extractable divalent cation is selected from the group consisting essentially of magnesium, calcium, strontium., barium, and mixtures thereof,
(c) the extractable univalent anion is selected from the group consisting essentially of chloride, nitrate, and mixtures thereof,
(d) the extractable divalent anion is selected from the group consisting essentially of sulfate, molybdate, and mixtures thereof, and
(e) the extractable trivalent anion is selected from the group consisting essentially of phosphate and vanadate and mixtures thereof.

6. The titanium dioxide pigment of claim 3 wherein:
a) the extractable univalent cation is selected from the group consisting essentially of lithium, sodium, potassium, rubidium, cesium, and mixtures thereof, (b) the extractable divalent cation is selected from the group consisting essentially of magnesium, calcium, strontium, barium, and mixtures thereof (c) the extractable univalent anion is selected from the group consisting essentially of chloride nitrate, and mixtures thereof, (d) the extractable divalent anion is selected from the group consisting essentially of sulfate, molybdate, and mixtures thereof, and (e) the extractable trivalent anion is selected from the group consisting essentially of phosphate, vanadate and mixtures thereof.

7. An electrophoretic coating composition containing the pigment of any one of claims 1-6.

8. Process for treating titanium dioxide pigment which comprises:
   (a) subjecting titanium dioxide pigment to a wet treatment which includes immersion in an aqueous medium;
   (b) adjusting the pH of the product of step (a) to about 6.5 to 7.5;
   (c) maintaining the pH of the product of step (b) at about 6.5 to 7.5 at a temperature and for a time which is sufficient to attain substantial equilibrium of the pH of the aqueous medium with the titanium dioxide pigment; and
   (d) removing the aqueous medium from the product of step (c) and washing the remaining titanium dioxide pigment until it has the properties specified in claim 1.

9. The process of claim 8 wherein step (d) comprises removing the aqueous medium from the product of step (c) and washing the remaining titanium dioxide pigment until it has the properties specified in claim 2.

10. The process of claim 8 wherein step (d) comprises removing the aqueous medium from the product of step (c) and washing the remaining titanium dioxide pigment until it has the properties specified in claim 3.

11. The process of claim 8 wherein step (d) comprises removing the aqueous medium from the product of step (c) and washing the remaining titanium dioxide pigment until it has the properties specified in claim 4.

12. The process of claim 8 wherein step (d) comprises removing the aqueous medium from the product of step (c) and washing the remaining titanium dioxide pigment until it has the properties specified in claim 5.

13. The process of claim 8 wherein step (d) comprises removing the aqueous medium from the product of step (c) and washing the remaining titanium dioxide pigment until it has the properties specified in claim 6.

14. The process of claim 8 wherein step (c) is carried out for at least about 10 minutes and the temperature is about 20°-95° C.

* * * * *